(12) United States Patent
He

(10) Patent No.: US 7,689,326 B2
(45) Date of Patent: Mar. 30, 2010

(54) HEADING AWARENESS SYMBOLOGY FOR TRACK CENTERED PRIMARY FLIGHT DISPLAYS

(75) Inventor: Gang He, Morristown, NJ (US)

(73) Assignee: Honeywell International Inc., Morristown, NJ (US)

(*) Notice: Subject to any disclaimer, the term of this patent is extended or adjusted under 35 U.S.C. 154(b) by 269 days.

(21) Appl. No.: 11/345,749

(22) Filed: Feb. 2, 2006

(65) Prior Publication Data

US 2007/0179684 A1    Aug. 2, 2007

(51) Int. Cl.
*G01C 23/00* (2006.01)
(52) U.S. Cl. .............. 701/3; 701/10; 701/13; 701/211; 340/972; 340/979
(58) Field of Classification Search ........... 701/3, 701/4, 10, 13, 200, 208, 211; 340/967, 971, 340/972, 973, 979; 345/619
See application file for complete search history.

(56) References Cited

U.S. PATENT DOCUMENTS

| | | | | |
|---|---|---|---|---|
| 4,977,401 | A * | 12/1990 | Sjoberg | 340/975 |
| 5,745,054 | A * | 4/1998 | Wilkens | 340/972 |
| 6,085,145 | A * | 7/2000 | Taka et al. | 701/120 |
| 6,320,579 | B1 | 11/2001 | Snyder et al. | |
| 6,748,325 | B1 | 6/2004 | Fujisaki | |
| 7,218,245 | B2 * | 5/2007 | Wyatt et al. | 340/973 |
| 2002/0036573 | A1 * | 3/2002 | Wyatt | 340/945 |
| 2003/0193411 | A1 | 10/2003 | Price | |
| 2004/0015274 | A1 | 1/2004 | Wilkins, Jr. et al. | |
| 2006/0250280 | A1 * | 11/2006 | Chen et al. | 340/974 |

OTHER PUBLICATIONS

EP Search Report, 07101598.6 dated Apr. 23, 2008.

* cited by examiner

*Primary Examiner*—Gertrude Arthur Jeanglaud
(74) *Attorney, Agent, or Firm*—Ingrassia Fisher & Lorenz, P.C.

(57) ABSTRACT

A method of providing heading awareness on a flight display is provided. The method comprises displaying a heading awareness symbology to indicate heading relative to track, and varying the prominence of the heading awareness symbology on a display element based on at least one sensed condition.

26 Claims, 6 Drawing Sheets

HEADING AWARENESS SYMBOLOGY FOR TRACK CENTERED PRIMARY FLIGHT DISPLAYS

BACKGROUND

During flight, aircraft track is not always the same as aircraft heading. For example, in the presence of crosswinds, an aircraft often has to adjust its heading in order to follow a desired course or track. As a result, some displays are track centered, others near-track centered and others are heading centered. Each type of display has its advantages and disadvantages.

In many flying situations, track centered displays have various advantages over heading centered displays. For example, a heading centered display is particularly sensitive to motion of the craft such as motion due to strong crosswinds. This motion can cause a flight path marker on the display to move around and collide with other flight symbology. This can be very distracting to a flight crew. A track centered display or a near track centered display, however, is substantially centered on the direction of travel. As a result, it is not as sensitive to craft motion and works well during flight.

A track centered or near track centered display, however, is not the best choice of displays during certain circumstances such as landing of the aircraft. When landing, the nose of the aircraft should be aligned with the direction of travel for safety purposes. In other words, the heading and track should be substantially aligned. If a flight crew is relying on a track centered display during a landing approach, everything may appear to be lined up correctly on the display since the track centered display is centered substantially on the direction of travel, but in reality the nose of the craft is not aligned. When the flight crew looks out a window, the scene will be different from the display. In fact, if the heading and track are sufficiently different, the runway may not even be directly visible out the window. This can be very startling and confusing to a flight crew.

SUMMARY

The above-mentioned problems and other problems are resolved by the present invention and will be understood by reading and studying the following specification.

In one embodiment, a method of providing heading awareness on a flight display is provided. The method comprises displaying a heading awareness symbology to indicate heading relative to track, and varying the prominence of the heading awareness symbology on a display element based on at least one sensed condition.

In another embodiment, a computer readable medium having computer executable instructions for performing a method of providing heading awareness on a flight display is provided. The method comprises calculating a location and prominence of a heading awareness symbology on a display element based on travel data in received signals, outputting the calculated location and prominence of the heading awareness symbology to the display element for displaying the heading awareness symbology, updating the calculated location and prominence of the heading awareness symbology based on later received travel data, and outputting the updated location and prominence of the heading awareness symbology to the display element for varying the location and prominence of the heading awareness symbology.

In another embodiment, a graphics display system is provided. The graphics display system comprises one or more sensors adapted to obtain travel data, a display element for displaying flight symbology, and at least one processing unit adapted to calculate the prominence of a heading awareness symbology based on the data obtained from the one or more sensors. The at least one processing unit is further adapted to send signals to the display element to display the heading awareness symbology with the calculated prominence, wherein the at least one processing unit updates the calculated prominence as travel data is updated and sends signals to the display element to vary the prominence of the heading awareness symbology as the calculated prominence is updated.

In another embodiment, a graphics display system is provided. The graphics display system comprises means for obtaining travel data, means for determining the prominence of a heading awareness symbology based on the obtained travel data, and means, responsive to the means for determining the prominence of the heading awareness symbology, for displaying the heading awareness symbology with the determined prominence.

DRAWINGS

DETAILED DESCRIPTION

Figure 1:
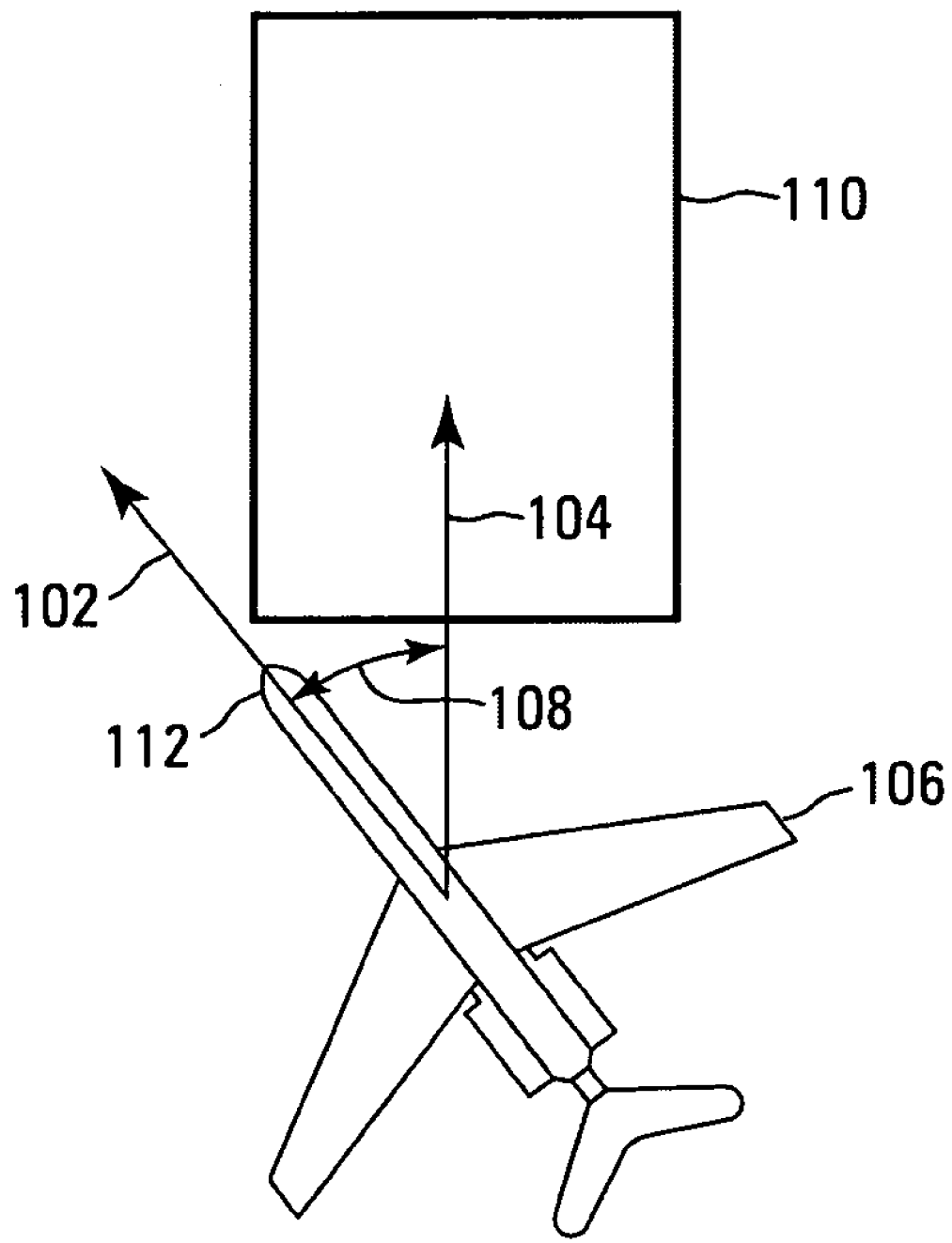
FIG. 1 is a diagram depicting track and heading of an aircraft.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. For example, although reference is made to airplanes, it is to be understood by one of skill in the art that embodiments of the present invention are also implemented in other crafts such as helicopters, boats, lunar landers, etc. It should be understood that the exemplary method illustrated may include additional or fewer steps or may be performed in the context of a larger processing scheme. Furthermore, the methods presented in the drawing figures or the specification are not to be construed as limiting the order in which the individual steps may be performed. The following detailed description is, therefore, not to be taken in a limiting sense.

Embodiments of the present invention ameliorate the problems of a track centered display used during situations, such as landing, during which a flight crew needs to be aware of differences in track and heading. Embodiments of the present invention accomplish this by providing a dynamically varied heading awareness symbology which alerts a flight crew to the differences in heading and track, and the need to align heading and track. For example, as shown in FIG. 1, heading 102 and track 104 of aircraft 106 are not aligned. The difference between heading 102 and track 104 is measured by drift angle 108. As aircraft 102 approaches runway 110 to land, a track centered display will display runway 110 in the center of the display. However, nose 112 of aircraft 106 is not aligned with runway 110. This is a dangerous situation for aircraft 106. Embodiments of the present invention alert a flight crew to this situation by dynamically varing the prominence of a heading awareness symbology as a function of aircraft position. In some embodiments, the prominence of the heading awareness symbology is varied as a function of altitude relative to runway 110. In other embodiments, the prominence of the heading awareness symbology is varied as a function of drift angle 108. In addition, some embodiments of the present invention provide a directional heading awareness symbology which indicates the direction in which to adjust heading to align heading with track.

Figure 2:
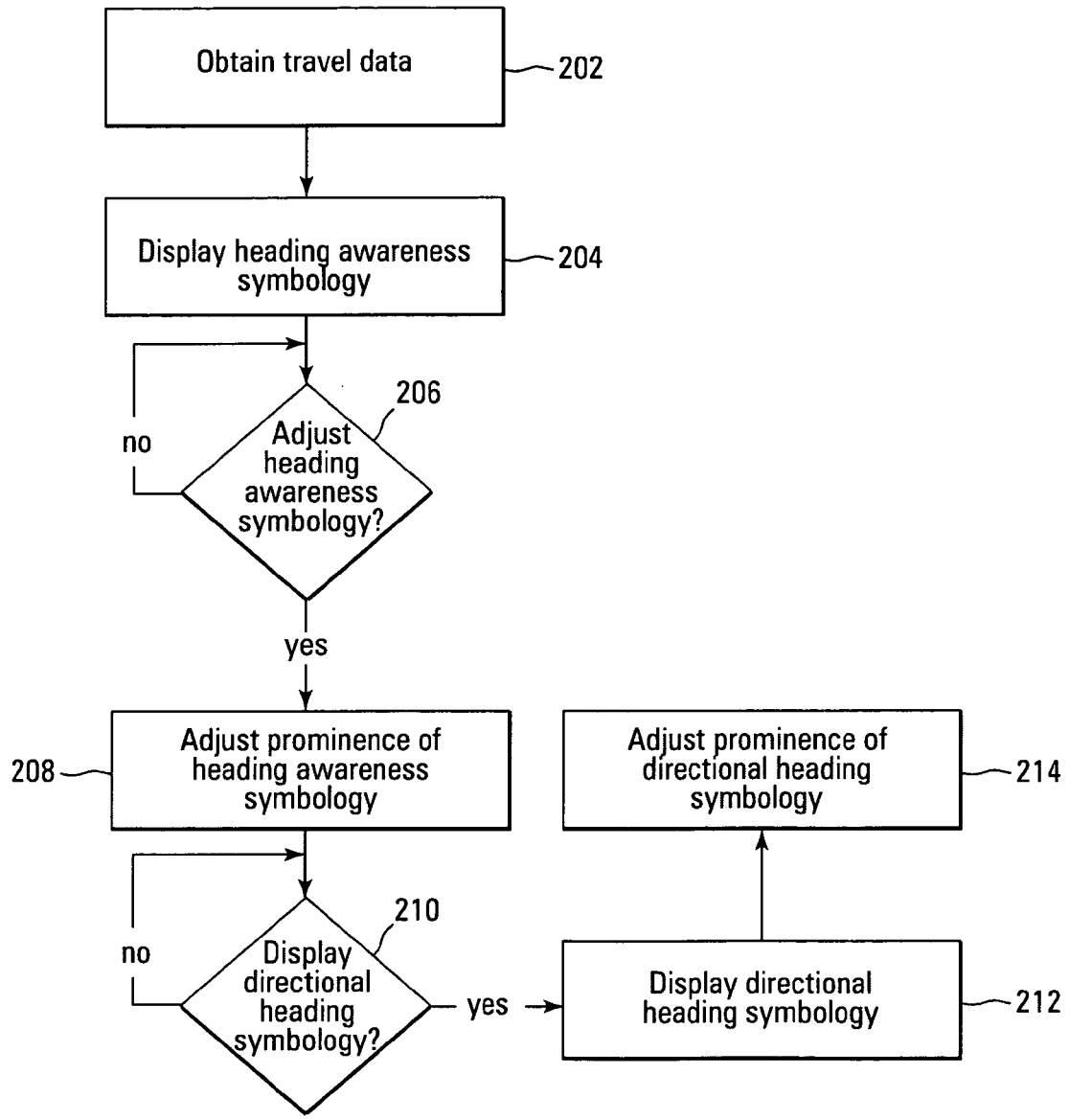
FIG. 2 is a flow chart showing a method of providing heading awareness on a flight display according to one embodiment of the present invention

FIG. 2 is a flow chart showing a method 200 of providing heading awareness on a flight display according to one embodiment of the present invention. Although method 200 is discussed herein as proceeding from one step to another step in a serial fashion, it will be understood by one of skill in the art that two or more processes in method 200 occur simultaneously in various embodiments of the present invention. At 202, travel data is obtained. Travel data includes, but is not limited to, heading, track, and altitude data. The travel data obtained at 202 is used at 204 to display heading awareness symbology on a display. The heading awareness symbology indicates heading relative to track. In embodiments using a track centered display, the heading awareness symbology indicates heading relative to the center of the display. In embodiments using a near track centered display, the difference between the heading awareness symbology and present track indicates the present drift angles.

At 206 it is determined when the prominence of the heading awareness symbology on the display should be varied. The prominence of the heading awareness symbology is varied based on at least one sensed condition, such as altitude and drift angle. In some embodiments, this determination is based on a comparison of a reference angle to a drift angle representing the difference between track and heading. If the drift angle is greater than the reference angle, the prominence of the heading awareness symbology is varied. In other embodiments, this determination is based on a comparison of the current altitude to a reference altitude. In such embodiments, if the current altitude is less than the reference altitude, the prominence of the heading awareness symbology is varied. In other embodiments, the determination is based on both current altitude and drift angle. Additionally, in some embodiments, if the drift angle exceeds a determined limit, the heading awareness symbology is ghosted. Ghosting the heading awareness symbology includes fixing the heading awareness symbology at the position of the determined limit and changing one of shape, size, outline, and color, etc. For example, if the heading awarness symbology overlaps other display symbology in order to represent a drift angle beyond a determined limit, the heading awareness symbology is ghosted for drift angles beyond that determined limit so that the other display symbology is not obscured and position awareness of the heading awareness symbology is maintained. If it is determined that the prominence of the heading awarness symbology is to be varied, method 200 continues at 208. Otherwise, method 200 continues to update data and check to determine when to vary the prominence of the heading awareness symbology.

At 208, the prominence of the heading awareness symbology is varied. Varying the prominence of the heading awareness symbology, includes, but is not limited to, varying one of color, size and brightness of the heading awareness symbology. The heading awareness symbology is varied as a function of one or more of drift angle and altitude. For example, in some embodiments, as the drift angle grows larger, the size of the heading awareness symbology also grows proportionally. Likewise, in some embodiments, as the altitude decreases, the size of the heading awareness symbology increases proportionally. In addition, in some embodiments, a maximum size is assigned so that the heading awareness symbology does not grow so large that it overlaps other display symbology. Likewise, in some embodiments, the heading awareness symbology is assigned a minimum size. For example, in some embodiments, the minimum size is determined such that flight crews are able to easily view and discern the heading awareness symobology.

By varying the prominence of the heading awareness symbology as a function of one or more of drift angle and altitude, embodiments of the present invention draw a flight crew's attention to the need to correct heading in situations such as landing. This is of particular importance when the flight crew is relying on a track centered or a near track-centered display prior to landing. In this way, embodiments of the present invention help improve a flight crew's awareness of adjustments needed to be made prior to landing.

At 210, it is determined when a directional heading symbology is to be displayed. The determination to display a directional heading symbology is based on at least one sensed condition, such as altitude and drift angle. In some embodiments, it is determined to display a directional heading symbology by comparing current altitude to a reference altitude. In some embodiments, the reference altitude is relative to a runway or touch down point. In such embodiments, if the current altitude is less than the reference altitude, the directional heading symbology is displayed at 212. In other embodiments, it is determined to display a directional heading symbology by comparing the drift angle to a reference angle. If the drift angle is greater than the reference angle, the directional heading symbology is displayed at 212. In other embodiments, the determination to display directional heading symbology is based on comparing both current altitude and a drift angle to reference values. In other embodiments, the directional heading symbology is always displayed. If it is determined to display the directional heading symbology, method 200 continues at 212. Otherwise, method 200 continues to update data and check to determine when the directional heading symbology is to be displayed.

At 212, the directional heading symbology is displayed. The directional heading symbology indicates the direction in which to adjust heading in order to align heading and track. In some embodiments, the directional heading symbology is an arrow pointing in the direction to adjust heading. In other embodiments, the directional heading symbology is a letter indicating direction. For example, in some such embodiments, the letter 'L' is used to indicate adjusting the heading to the left and the letter 'R' is used to indicate adjusting the heading to the right. In other embodiments, words are used as the directional heading symbology to indicate the direction to adjust heading. For example, in some such embodiments, the word 'Left' is used to indicate adjusting the heading to the left and the word 'Right' is used to indicate adjusting the heading to the right.

At 214, the prominence of the directional heading symbology is varied as a function of one or more of altitude and drift angle. Varying the prominence of the directional heading symbology, includes, but is not limited to, varying one of color, size and brightness of the directional heading symbology. The directional heading symbology enables additional awareness of the difference between heading and track. For example, if a member of a flight crew switched from looking at a track centered display to a view out a window, the view may drastically change (e.g. the runway seen on the track centered display may not be visible out the window due to the drift angle). The directional heading symbology orients the member to the direction that the aircraft heading must be adjusted as well as the direction to look in order to see substantially the same view out the window as seen on a track centered display.

Figure 3:
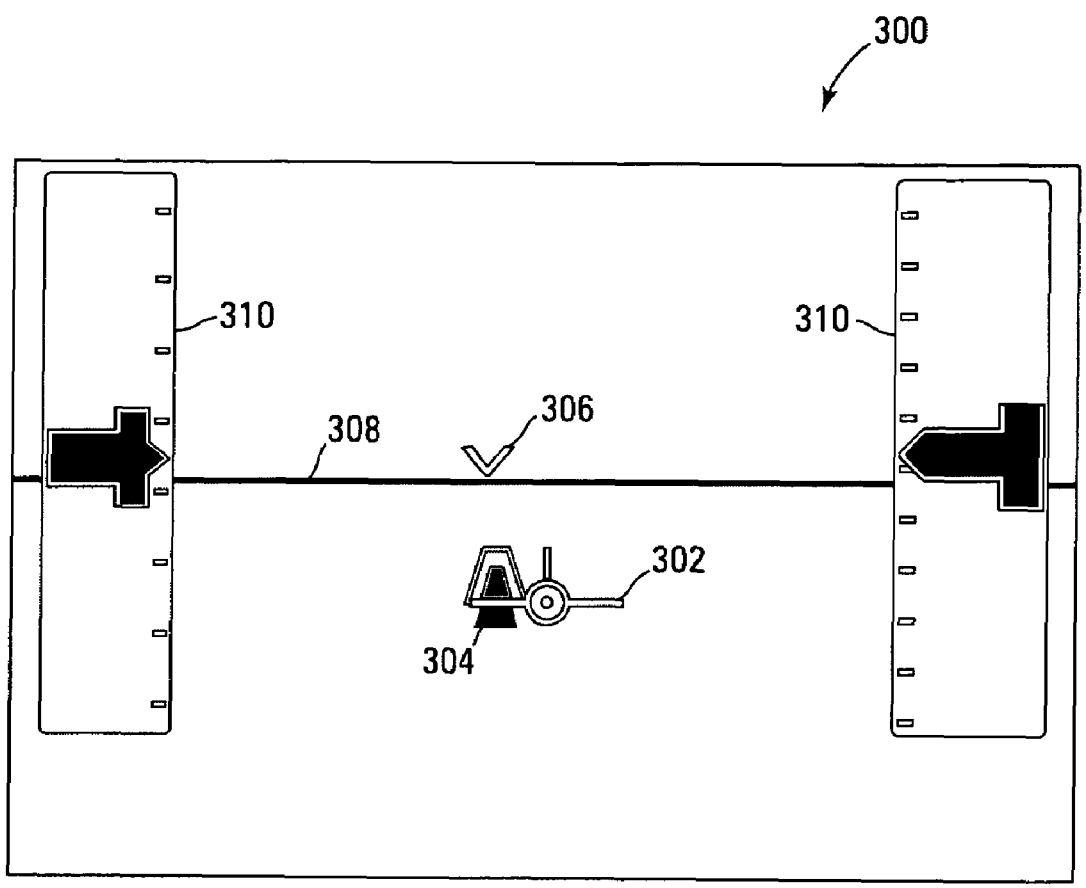
FIG. 3 is an image of a track centered display according to one embodiment of the present invention.

FIG. 3 is an image of a track centered display 300 according to one embodiment of the present invention. Track centered display 300 includes flight path marker 302 which is located at a point substantially near a horizontal center point of display 300. In track centered display 300, flight path marker 302 stays substantially fixed at the same point indicating the actual direction of travel. Also shown on display 300 is runway 304 where the aircraft utilizing track centered display 300 is to land and flight symbology 310 used for navigation of the aircraft. Heading awareness symbology 306 indicates actual heading of the aircraft. Heading awareness symbology 306 moves laterally left and right indicating changes in heading relative to aircraft track. In some embodiments, heading awareness symbology 306 is ghosted if heading awareness symbology 306 overlaps or interferes with other flight symbology. For example, in FIG. 3, if heading awareness symbology overlaps flight symbology 310 in order to indicate a drift angle, heading awareness symbology 306 is ghosted as described above. As shown in the exemplary embodiment in FIG. 3, heading awareness symbology 306 is placed near zero pitch reference line 308. However, it will be understood that in other embodiments, heading awareness symbology 306 is displayed in other locations on display 300.

Figure 4:
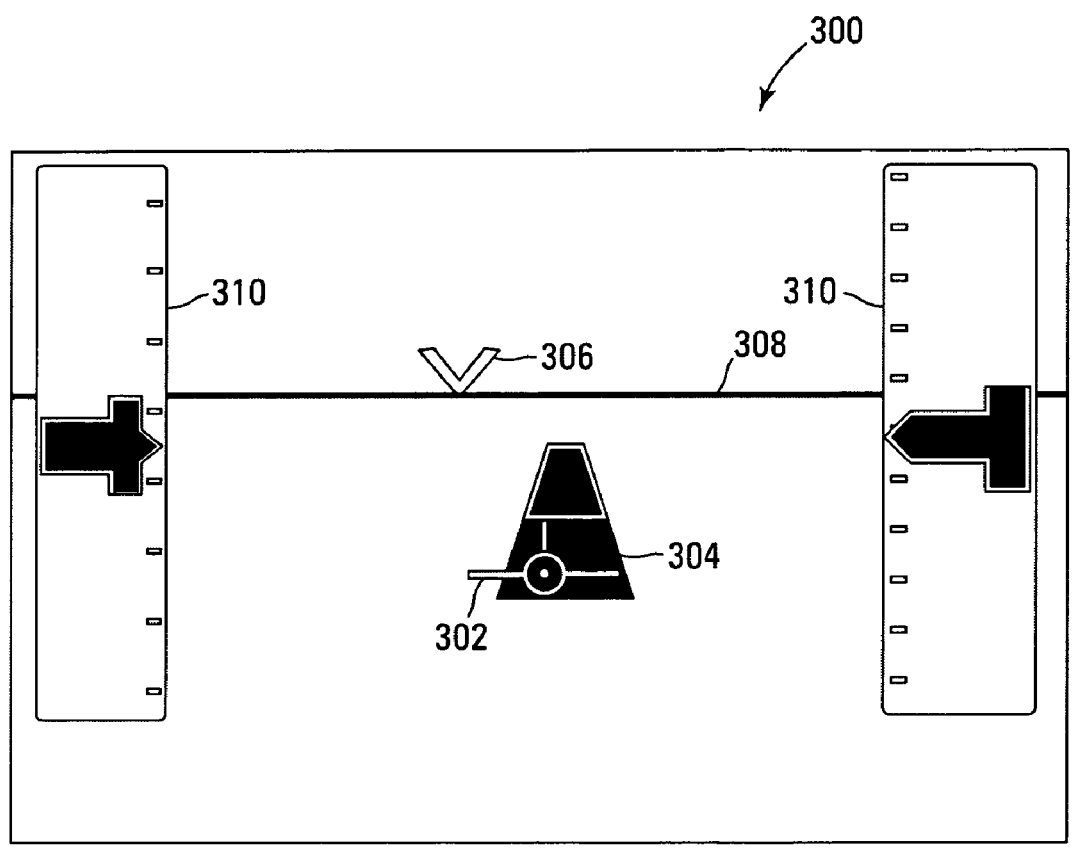
FIG. 4 is another image of a track centered display according to one embodiment of the present invention.

FIG. 4 is another image of a track centered display 300 according to one embodiment of the present invention. In FIG. 4, the prominence of heading awareness symbology 306 is varied. As can be seen, heading awareness symbology 306 is larger in FIG. 4 than in FIG. 3. The size increase is a function of aircraft altitude relative to runway 304, in some embodiments. In other embodiments, the size increase is a function of drift angle. In yet other embodiments, the size increase is a function of both altitude and drift angle. Additionally, in other embodiments, the color of heading awareness symbology 306 is varied as a function of one or more of altitude and drift angle. In yet other embodiments, the brightness of heading awareness symbology 306 is varied as a function of one or more of altitude and drift angle.

Figure 5:
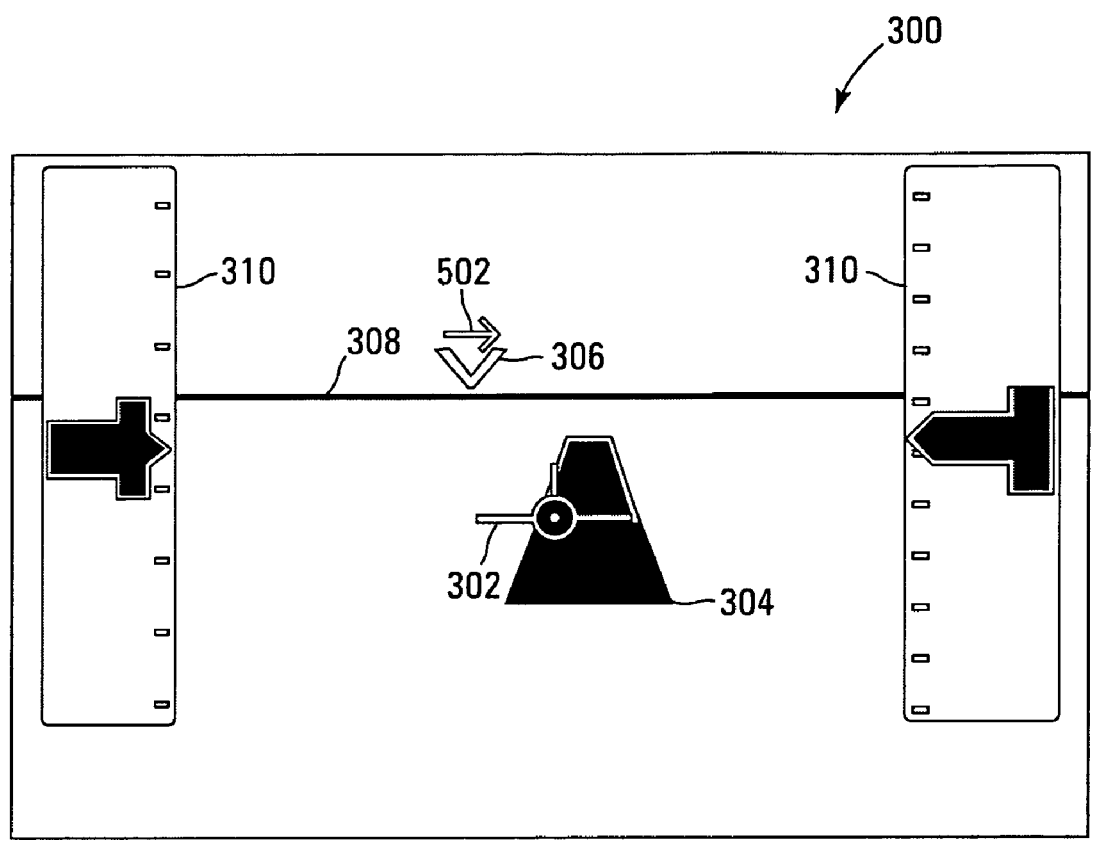
FIG. 5 is another image of a track centered display according to one embodiment of the present invention.

FIG. 5 is another image of a track centered display 300 according to one embodiment of the present invention. In FIG. 5, directional heading symbology 502 is included. In some embodiments, directional heading symbology 502 is an arrow as shown in FIG. 5. In other embodiments, directional heading symbology 502 is one of a letter and a word. Directional heading symbology 502 indicates the direction in which heading must be changed to align with track. In addition, in some embodiments, the prominence of directional heading symbology 502 is varied as a function of one or more of altitude and drift angle. The prominence of directional heading symbology 502 is varied by varying one or more of the size, color and brightness of directional heading symbology 502. Varying the prominence of directional heading symbology 502 provides further cues to a flight crew of the need to correct heading and in what direction to correct heading. For example, as aircraft reduces its altitude coming closer to a runway, the prominence of directional heading symbology 502 is varied to indicate the increased need to correct heading since the aircraft is now closer to the dangerous condition of landing without the nose being aligned with the runway.

Figure 6:
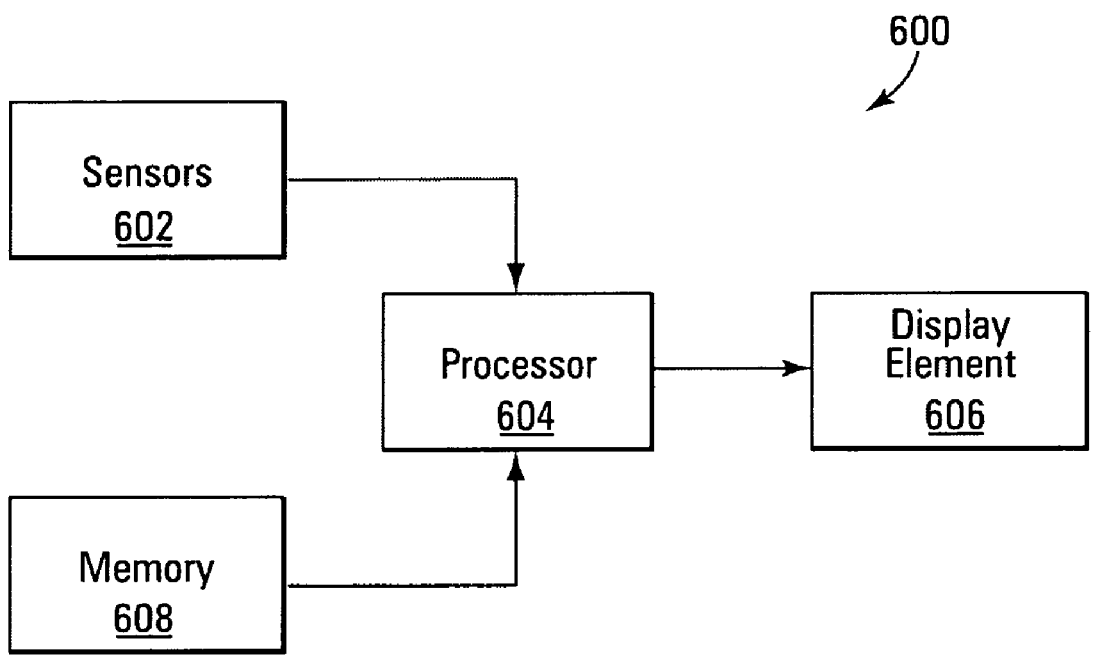
FIG. 6 is a block diagram of a graphic display system according to one embodiment of the present invention.

FIG. 6 is a block diagram of a graphic display system 600 according to one embodiment of the present invention. In FIG. 6, an exemplary graphical display system 600 includes processor 604 configured to provide data and instructions for display to display element 606. One or more sensors 602 are coupled to processor 604. Sensors 602 are used to provide travel data to processor 604 for use by processor 604. For example, in some embodiments, sensors 602 provide data regarding heading data, track data, and altitude data. In other embodiments, sensors 602 are also used to provide data to processor 604 for display on display element 606. For example, in some embodiments, sensors 602 provide photographs and digital images of terrain for display on display element 606. Sensors 602 include, but are not limited to, barometric altimeters, radar altimeters, cameras, global positioning system (GPS) receivers, speedometers, etc.

Memory 608 includes any type of suitable medium such as floppy disks, conventional hard disks, DVD-RW, CD-RW, reprogrammable non-volatile memory such as flash memory and EEPROM, volatile memory such as dynamic RAM and static RAM, and any other existing or later developed suitable medium. Processor 604 and memory 608 are coupled together allowing processor 604 to write to and store data in memory 608 as well as retrieve stored data from memory 608. In some embodiments, memory 608 stores data received by processor 604 from sensors 602. In other embodiments, memory 608 temporarily stores data to be transmitted from processor 604 to display element 606. In yet other embodiments, memory 608 is used to store data regarding current and past altitude, heading and track data.

Display element 606 includes any display element suitable for displaying the various symbols and information for the operation of embodiments of the present invention. There are many known display elements that are suitable for this task, such as various CRT, active and passive matrix LCD, organic LED, and other existing or later developed display technology. Processor 604 is coupled to and sends appropriate signals to display element 606 for displaying of heading awareness symbology and directional heading symbology.

Processor 604 includes or interfaces with hardware components that support the graphics display system. By way of example and not by way of limitation, these hardware components include one or more microprocessors, graphics processors, memories, storage devices, interface cards, and other components used to process data for calculating location and prominence of heading awareness symbology and directional heading symbology on display element 606. Additionally, processor 604 includes or functions with software programs, firmware or computer readable instructions for carrying out various methods, process tasks, calculations, control functions, and the generation of display signals and other data used in the operation of the display system. These programs, firmware, or instructions are typically stored on any appropriate medium used for storage of computer readable instructions such as floppy disks, conventional hard disks, CD-ROM, flash ROM, nonvolatile ROM, RAM, and other like medium.

According to software programs, firmware, or computer readable instructions, processor 604 calculates a location and prominence of a heading awareness symbology based on travel data received in signals from sensors 602. Travel data includes, but is not limited to, one or more of heading, track and altitude data. Processor 604 sends signals to display element 606 to display the heading awareness symbology in the calculated location on display element 606 and with the calculated prominence. In some embodiments, processor 604 also calculates a location and prominence of a directional heading symbology based on the travel data received in signals from sensors 602. Processor 604 sends signals to display element 606, in such embodiments, to display the directional heading symbology with the calculated location and prominence. Calculating the prominence of the heading awareness symbology and the directional heading symbology includes, but is not limited to, calculating the size, color and brightness of the heading awareness symbology and the directional heading symbology.

In some embodiments, processor 604 calculates a drift angle based on heading and track data received from sensors 602. In some such embodiments, processor 604 calculates the prominence of the heading awareness symbology and the directional heading symbology as a function of the calculated drift angle. In some embodiments, processor 604 compares the calculated drift angle to a reference angle and only updates the prominence of the heading awareness symbology when the drift angle is greater than the reference angle. Additionally, in some embodiments, processor 604 only sends a signal to display element 602 to display the directional heading symbology when the drift angle is greater than the reference angle. In other embodiments, processor 604 compares current altitude to a reference altitude and only updates the prominence of the heading awareness symbology if the current altitude is less than the reference altitude. Similary, in some embodiments, processor 604 only sends a signal to display element 602 to display the directional heading symbology if the current altitude is less than the reference altitude.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of providing heading awareness on a flight display, comprising:
   displaying a heading awareness symbol to indicate heading relative to track; and
   varying the prominence of the heading awareness symbology on a display element based on at least one sensed condition.

2. The method of claim 1, further comprising:
   ghosting the heading awareness symbology, if a drift angle exceeds a determined limit.

3. The method of claim 1, wherein varying the prominence of the heading awareness symbology comprises varying one or more of the brightness, the size, and the color of the heading awareness symbology.

4. The method of claim 1, wherein varying the prominence of the heading awareness symbology based on at least one sensed condition further comprises one of varying the prominence of the heading awareness symbology when current altitude is less than a reference altitude, and varying the prominence of the heading awareness symbology when a drift angle is greater than a reference angle.

5. The method of claim 1, wherein varying the prominence of the heading awareness symbology based on at least one sensed condition further comprises varying the prominence of the heading awareness symbology as a function of one or more of current altitude and drift angle.

6. The method of claim 1, further comprising:
   displaying a directional heading symbology based on at least one sensed condition.

7. The method of claim 6, wherein displaying a directional heading symbology comprises displaying the directional heading symbology when current altitude is less than a reference altitude.

8. The method of claim 6, wherein displaying a directional heading symbology comprises displaying one of an arrow, a letter to indicate direction and a word to indicate direction.

9. The method of claim 6, further comprising:
   varying the prominence of the directional heading symbology as a function of one or more of current altitude and drift angle.

10. The method of claim 9, wherein varying the prominence of the directional heading symbology comprises adjusting one or more of the color, the brightness, and the size of the directional heading symbology.

11. A computer readable medium having computer readable executable instructions recorded thereon for performing a method of providing heading awareness on a flight display, the method comprising:
    calculating a location and a prominence of a heading awareness symbology for rendering on a display indicating heading relative to track based on travel data in received signals;
    outputting the calculated location and prominence of the heading awareness symbology to the display element for displaying the heading awareness symbology;
    updating the calculated location and prominence of the heading awareness symbology based on later received travel data; and
    outputting the updated location and prominence of the heading awareness symbology to the display element for varying the location and the prominence of the heading awareness symbology.

12. The method of claim 11, wherein calculating a prominence of a heading awareness symbology comprises calculating one or more of the color, the size, and the brightness of the heading awareness symbology.

13. The method of claim 11, wherein calculating the location and prominence of the heading awareness symbology based on the travel data in received signals further comprises calculating the prominence of the heading awareness symbology based on one or more of altitude, track and heading data in the received signals.

14. The method of claim 11, further comprising:
    calculating a location and prominence of a directional heading symbology on the display element based on the travel data in received signals; and
    outputting the calculated location and prominence of the directional heading symbology to the display element.

15. The method of claim 14, further comprising:
    updating the calculated location and prominence of the directional heading symbology based on the later received travel data; and
    outputting the updated location and prominence of the directional heading symbology to the display element for varying the location and prominence of the directional heading symbology.

16. A graphics display system, comprising:
    one or more sensors adapted to obtain travel data;
    a display element for displaying flight symbology; and
    at least one processing unit adapted to calculate the prominence of a heading awareness symbology indicating heading relative to track based on the data obtained from the one or more sensors, the at least one processing unit being further adapted to send signals to the display element to display the heading awareness symbology with the calculated prominence, wherein the at least one processing unit updates the calculated prominence as the travel data is updated and sends signals to the display element to vary the prominence of the heading awareness symbology as the calculated prominence is updated.

17. The graphics display system of claim 16, wherein the at least one processing unit is adapted to calculate one or more of the size, the color and the brightness of the heading awareness symbology based on the travel data.

18. The graphics display system of claim 16, wherein:
the one or more sensors are adapted to obtain one or more of track, heading, and altitude data; and
the at least one processing unit is adapted to send signals to calculate the prominence of the heading awareness symbology as a function of one or more of altitude and a drift angle calculated by the at least one processing unit based on track and heading data.

19. The graphics display system of claim 16, wherein the at least one processing unit is further adapted to calculate the prominence of a directional heading symbology based on the travel data and to send signals to the display element to display a directional heading symbology with the calculated prominence.

20. The graphics display system of claim 19, wherein the at least one processor is further adapted to update the calculated prominence as travel data is updated and send signals to the display element to vary the display of the directional heading symbology with the updated prominence.

21. The graphics display of claim 20, wherein the at last one processor is further adapted to calculate one or more of the color, the size and the brightness of the directional heading symbology based on the travel data.

22. A graphics display system, comprising:
means for obtaining travel data;
means for determining the prominence of a heading awareness symbology indicating heading relative to track based on the obtained travel data;
means, responsive to the means for determining the prominence of the heading awareness symbology, for displaying the heading awareness symbology with the determined prominence; and
means for varying the prominence of the heading awareness symbology based on at least one sensed condition.

23. The graphic display of claim 22, wherein the means for obtaining travel data is adapted to obtain one or more of track data, heading data and altitude data.

24. The graphics display system of claim 23, further comprising:
means for calculating a drift angle based on obtained track data and heading data; and
wherein the means for determining the prominence of the heading aware symbology is further adapted to determine the prominence of the heading awareness symbology as a function of drift angle.

25. The graphic display of claim 22, wherein:
the means for determining the prominence of the heading awareness symbology is further adapted to determine the prominence of a directional heading symbology; and
the means for displaying the heading awareness symbology is further adapted to display the directional heading symbology with the determined prominence.

26. The graphics display system of claim 22, wherein the means for determining the prominence of a heading awareness symbology is adapted to determine one or more of the color, the size, and the brightness of the heading awareness symbology based on the obtained travel data.

* * * * *